US012613125B2

(12) United States Patent
Klein et al.

(10) Patent No.: US 12,613,125 B2
(45) Date of Patent: Apr. 28, 2026

(54) SENSOR MEANS OR MODULE FOR DETERMINING A DISPLACEMENT OR DEFLECTION OR BENDING, HOUSEHOLD APPLIANCE AND METHOD FOR DETERMINING THE WEIGHT OF AN ITEM

(71) Applicant: ELECTROLUX APPLIANCES AKTIEBOLAG, Stockholm (SE)

(72) Inventors: Gerhard Klein, Rothenburg ob der Tauber (DE); Ulrich Häutle, Rothenburg ob der Tauber (DE); Lukasz Wasinkiewicz, Rothenburg ob der Tauber (DE); Jacek Jurek, Rothenburg ob der Tauber (DE); Elia Schiaratura, Forli (IT); Emanuel Urgese, Forli (IT); Michele Forti, Forli (IT); Svend Erik Christiansen, Forli (IT); Alex Viroli, Forli (IT); Andrea Rossi, Forli (IT); Laurent Jeanneteau, Compiègne (FR); Massimo Nostro, Forli (IT); Massimo Zangoli, Forli (IT); Diana Valerio, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 567 days.

(21) Appl. No.: 17/913,486

(22) PCT Filed: Mar. 17, 2021

(86) PCT No.: PCT/EP2021/056763
§ 371 (c)(1),
(2) Date: Sep. 22, 2022

(87) PCT Pub. No.: WO2021/197844
PCT Pub. Date: Oct. 7, 2021

(65) Prior Publication Data
US 2023/0137254 A1 May 4, 2023

(30) Foreign Application Priority Data

Apr. 3, 2020 (EP) ..................................... 20167868

(51) Int. Cl.
| | |
|---|---|
| *G01G 19/56* | (2006.01) |
| *A47J 27/00* | (2006.01) |
| *G01P 15/135* | (2006.01) |

(52) U.S. Cl.
CPC ............ *G01G 19/56* (2013.01); *A47J 27/002* (2013.01); *G01P 15/135* (2013.01)

(58) Field of Classification Search
CPC ....... G01G 19/52; G01G 19/56; G01P 15/135
See application file for complete search history.

(56) References Cited

U.S. PATENT DOCUMENTS

| | | | | | |
|---|---|---|---|---|---|
| 5,183,996 | A | * | 2/1993 | Hazan | F24C 15/108 219/457.1 |
| 5,958,272 | A | * | 9/1999 | Taplan | F24C 7/083 219/465.1 |

(Continued)

FOREIGN PATENT DOCUMENTS

| | | |
|---|---|---|
| CN | 2173229 Y | 8/1994 |
| CN | 106594808 | 4/2017 |

(Continued)

OTHER PUBLICATIONS

Machine translation of DE-3811942-A1 (Year: 1989).*

(Continued)

*Primary Examiner* — Natalie Huls
(74) *Attorney, Agent, or Firm* — Chrisman Gallo Tochtrop LLC

(57) ABSTRACT

The present invention relates to a sensor means (11, 35, 49, 71) or module for determining a particularly elastic displacement or deflection or bending of a panel (3), in particular a (Continued)

glass panel, or of a section of a panel or of an insert in relation to the panel (3). The sensor means (11, 35, 49, 71) or module and the panel (3) or said section thereof forming a weighing means, in particular a scale. The sensor means (11, 35, 49, 71) or module is adapted to be integrated in or allocated to a household appliance (1), in particular a cooking hob, more in particular an induction cooking hob, and comprises or is connected to at least one processing and/or interpretation and/or compilation means, preferably for providing a particular high sensor sensitivity and/or evaluation unit accuracy. Further, a household appliance (1) is disclosed which comprises an at least approximately horizontal panel (3), in particular a glass panel. The panel (3) is part of or is in functional connection with a scale for weighing an item (15) placed on the panel (3). Finally, the invention relates to a method for determining the weight of an item (15) on an at least approximately horizontal panel (3) of a household appliance (1), in particular on a top panel (3) of a cooking hob. An acceleration of a panel (3) section or of a panel reference point or reference area, in particular a reference point or a reference area on a panel surface (7), is estimated or determined during a displacement or deflection or bending of the panel section or the panel reference point or reference area due to a placing of the item (15) on the panel.

20 Claims, 6 Drawing Sheets

(56)  References Cited

U.S. PATENT DOCUMENTS

| | | | | | |
|---|---|---|---|---|---|
| 2002/0088452 | A1 * | 7/2002 | Neumayer | ............. | H05B 3/746 |
| | | | | | 126/39 J |
| 2002/0092844 | A1 * | 7/2002 | Horn | ...................... | H05B 3/746 |
| | | | | | 219/506 |
| 2003/0205570 | A1 * | 11/2003 | Neumayer | ............. | H05B 3/141 |
| | | | | | 219/447.1 |
| 2004/0012701 | A1 * | 1/2004 | Nagai | ................... | G06F 1/1616 |
| | | | | | 348/333.12 |

| | | | | | |
|---|---|---|---|---|---|
| 2010/0163549 | A1 | 7/2010 | Gagas et al. | | |
| 2015/0099245 | A1 * | 4/2015 | Bouchard | ................ | A61B 5/16 |
| | | | | | 434/127 |
| 2019/0212016 | A1 | 7/2019 | Konneker et al. | | |
| 2019/0234617 | A1 | 8/2019 | Bhogal et al. | | |
| 2022/0373386 | A1 * | 11/2022 | Herlitzius | ............. | G01G 3/165 |
| 2023/0094391 | A1 * | 3/2023 | Viroli | ................... | H05B 6/1209 |
| | | | | | 219/622 |

FOREIGN PATENT DOCUMENTS

| | | | | |
|---|---|---|---|---|
| CN | 106688307 | A | 5/2017 | |
| CN | 108604138 | | 9/2018 | |
| CN | 108604138 | A | 9/2018 | |
| CN | 108954405 | | 12/2018 | |
| CN | 110325833 | A | 10/2019 | |
| CN | 209899148 | | 1/2020 | |
| CN | 1598596 | A | 3/2025 | |
| DE | 3811942 | A1 * | 10/1989 | .............. G01G 3/15 |
| DE | 9410156 | | 9/1994 | |
| DE | 19612621 | | 10/1997 | |
| DE | 19926513 | | 12/2000 | |
| DE | 102005052274 | A1 * | 5/2007 | ............. F24C 15/10 |
| DE | 102006004381 | A1 | 8/2007 | |
| DE | 102012216935 | A1 * | 3/2014 | ............. F24C 15/10 |
| DE | 102016114822 | B3 | 10/2017 | |
| DE | 102016221546 | A1 * | 5/2018 | ............. G01G 21/22 |
| DE | 102018009319 | A1 * | 5/2020 | |
| EP | 3172996 | | 5/2017 | |
| EP | 3182020 | A1 * | 6/2017 | ............. F24C 15/10 |
| KR | 101880866 | B1 | 7/2018 | |
| TW | 201125536 | A | 8/2011 | |
| WO | 03014455 | A2 | 2/2003 | |
| WO | 2019138312 | | 7/2019 | |

OTHER PUBLICATIONS

International Search Report and Written Opinion for PCT/EP2021/056763, dated Jul. 20, 2021, 19 pages.

Chinese Office action for application No. 202180025962.0 dated Mar. 3, 2025, 20 pages.

An Office Action issued in corresponding Brazilian Patent Application No. BR112022019502-8; Dated: Feb. 26, 2026.

* cited by examiner

Fig.1

Strain [um/um]　　　　Voltage [mV]　　　　　　　　　Voltage [V]

SENSOR MEANS OR MODULE FOR DETERMINING A DISPLACEMENT OR DEFLECTION OR BENDING, HOUSEHOLD APPLIANCE AND METHOD FOR DETERMINING THE WEIGHT OF AN ITEM

The present invention relates to a sensor means or module for determining a displacement or deflection or bending, in particular an elastic displacement or deflection or bending, of a panel or of a section thereof or of an insert in relation to the panel. The present invention further relates to a household appliance, in particular a cooking hob, more in particular an induction cooking hob, comprising an at least approximately horizontal panel. Finally, the present invention relates to a method for determining the weight of an item on an at least approximately horizontal panel of a household appliance, in particular on a top plate of a cooking hob.

For a proper treatment of items in households it may be beneficial to know the weight of the items. For example, an overloading of the oscillating system in washing machines can be avoided if the user knows the actual loading condition of the introduced laundry. Further, the dosage amount of a detergent can be adjusted to the laundry loading. In the field of food preparation, a weighing unit or device integrated in or allocated to a cooking hob or an oven can assist the user in precisely adding amounts of ingredients to the food, even after start of the cooking process or already during the preparation process to make the food ready to be cooked, and there is no need for an extra kitchen scale taking up space of the kitchen worktop.

From DE 199 26 513 A1 a cooking hob with a scale unit is known. The cooking hob comprises a glass top plate and a detection unit, which identifies a deformation of the top plate as a result of the weight load of a cooking vessel and determines the related weight. The detection unit includes a bending bar and dedicated strain gauges, the latter being connected to a processing circuitry for the interpretation of the signals of the strain gauges.

It is an object of the present invention to provide a sensor means or module, a household appliance and/or a method for determining the weight of an item, which further improve weight determination of items by means of measurement technology relying on a displacement or deflection or bending of a panel.

According to a first aspect of the invention, a sensor means or module is provided for determining a displacement or deflection or a bending of a panel, in particular a glass or glass ceramic panel, or of a section of a panel or of an insert in relation to the panel. Said displacement or deflection or bending, which is particularly an elastic displacement or deflection or bending, may be any kind of dislocation of the whole panel in relation to its original or regular position or alignment, particularly its planar alignment, or of only a section of the panel in relation to the other section or sections, which remain(s) unaffected. Also a dislocation of an insert part or insert component in relation to the panel, which is particularly an unaffected panel, may be covered. The expression "determining a displacement or deflection or bending" may be understood as a pure detection of the existence of such kinds of dislocations or as an estimation or an exact measuring of the value or level thereof. The sensor means or module and the panel or said section thereof form a weighing means, in particular a weighing scale. The sensor means or module is adapted to be integrated in or allocated to a household appliance and comprises or is connected to at least one processing and/or interpretation and/or compilation means, which may provide for a particular high sensor sensitivity and/or evaluation unit accuracy. The household appliance may be a cooking hob, in particular an induction cooking hob, and said panel, specifically said glass panel, may be a top plate comprising at least one cooking zone.

The sensor means or module may be or may comprise a photosensor for measuring a distance to a surface of the panel. A reference point or a reference area may be defined on the panel for the distance measurement. The photosensor is preferably positioned underneath the panel. Moreover, the photosensor may be a photointerrupter. With this type of sensor specifically small surface movements, occurring in the case of glass displacement or deflection or bending, of about 0.01 to 0.3 mm are detectable and measurable. Photointerrupters usually show a high resolution in the distance between 0 and 0.5 mm.

According to a specific embodiment, the photosensor is a reflective type photosensor and the reference point or reference area for the distance measurement comprises a reflection surface. Said reflection surface is preferably a shiny surface, particularly a shiny metallic surface, of the panel. The reflection surface may also be a printed glass surface, particularly a glass surface with a metal evaporation. Finally, it may be a surface of a drop of a colour or print, particularly a white colour drop, applied on the panel surface, in particular facing the photosensor.

The sensor means or module, in particular the photosensor, may be arranged or arrangeable distant from the panel, which arrangement may be favourable for a precise distance measurement. An advantageous arrangement is performed at a housing or a frame part of the household appliance or of a component or module arranged inside of the household appliance. In a preferred embodiment, the photosensor is applied on a printed circuit board, which is particularly connected to or fixed to the housing or to the frame part.

In addition or as an alternative to the above-described embodiment comprising a photosensor, an acceleration sensor for a detection of an acceleration of the panel section or of a panel reference point or reference area during the, particularly elastic, displacement or deflection or bending of the panel section or the panel reference point or panel reference area due to a is placing of an item to be weighed on the panel may be provided. Said reference point or reference area may be located on a panel surface. Said acceleration sensor may at least be adapted to detect the incidence of an acceleration and consequently a downward deflection of the panel section or panel reference point or area. It may be possible to determine the duration of the acceleration and a reverse point or time of a potential overshoot until the panel becomes stationary in a deflected or bent condition.

Advantageously, the sensor means or module comprises calculation means for an estimation of the displacement or deflection or bending of the panel section or the panel reference point or panel reference area by integration of the acceleration or of the accelerated movement, preferably integration over time. With said integration the value or intensity of the deflection or bending, particularly after finalization of overshooting and stabilization in the deflected or bent condition, may be exactly calculated. Further, having determined the value or intensity of deflection or bending, an approximate weight estimation may be performed by means of a database, particularly of a look-up table comprised therein.

A further additional or alternative embodiment of the sensor means or module is characterized by at least one strain gauge and/or extensometer, which is placed on or allocated to a bottom surface of the panel and which is adapted to determine the value of a length extension of the bottom surface during the downwards deflection or bending of the panel. Said embodiment may be further characterized by a Wheatstone bridge circuit for the estimation of a strain resistance corresponding to the strain level or the value of a length extension. Said length extension may be measured in at least one arbitrary direction, at least when the at least one strain gauge and/or extensometer is positioned in a is centre area of the panel.

Preferably, at least a second strain gauge may be oriented in at least a second direction in order to improve the measurement. In the case of more than one strain gauge, a provision of a corresponding number of Wheatstone bridges may be considered, but it may be generally sufficient to provide a modification of the configuration of the (one) Wheatstone bridge accordingly.

In order to further improve evaluation accuracy, an amplifier may be allocated to or connected to the sensor means or module, in particular to the strain gauge and/or to the extensometer and/or to the Wheatstone bridge circuit. As above, if in the case of more than one strain gauge a corresponding number of Wheatstone bridges should be considered, then also the number of amplifiers may correlate with the number of strain gauges and/or extensometers and/or Wheatstone bridges. However, as mentioned above, since in said case of at least two strain gauges the provision of an only modified Wheatstone bridge is generally sufficient, in this constellation there is also no need for providing more than one amplifier.

In a preferred embodiment, the sensor means or module comprises a specifically increased bridge voltage of the Wheatstone bridge circuit, which can be a further measure for a further improved evaluation accuracy. Typically, the bridge voltage, which is also named as "excitation voltage", may have a value of 5V or 12V. The sensitivity of the bridge is strictly related to the voltage value, therefore, if the sensitivity will be not sufficient, the excitation voltage will be increased accordingly. Another course of action could be to provide for a specifically increased gauge factor of the strain gauge, the gauge factor preferably being greater than 2. Many different strain gauge types are available, in particular differing in the material they are made of. Their gauge factors may be within a range of 2 (for a cheap solution) to around 16 (for more expensive solutions). Finally, also a low noise amplifier and/or a rail to rail amplifier and/or a high gain instrumentation amplifier may be used in addition or alternatively for the desired accuracy.

Yet another further additional or alternative embodiment of the sensor means or module provides the insert, which is displaced or moved in relation to the panel under the weight of an item to be weighed, for being a, preferably removable, cover part or lid of a downdraft device or system in or allocated to a household appliance. Said cover part or lid is particularly an element of a downdraft cooking hob.

In particular, the sensor means is arranged between the cover part and a collar for supporting the cover part, wherein the collar is arranged at the panel and forms an upper frame of a filter element or a filter inlet. Specifically, the sensor means is coupled with the cover part or with the collar.

In order to enable a removal and/or an exchange of said sensor means and/or of said cover part, magnetic and/or adhesive elements or other fixing elements or means may be comprised for an adherence of the cover part at the panel, particularly at said collar, and/or of the sensor means at the cover part or at the collar.

Preferably, the sensor means comprise multiple single sensor elements, preferably a number of between two and six, more preferably between two and four, spaced apart from each other on a circle, the number of single sensor elements particularly being subject to an equal weight load. A provision of three single sensor elements, which are arranged on the corners of an equilateral triangle, may provide a particular equability of weight distribution, since the cover part or lid will uniformly rest on said evenly spread single senor elements. Alternatively, four single sensor elements may be provided in the corners of a rectangle, particularly of a square. The provision of more than only one single sensor element may end up in an increased precision of weight determination, in particular by a comparison of the single weight measurements. On the other hand, the more single sensor elements will be provided, the higher the costs for the total arrangement will be. For cost saving purposes, an arrangement of only one single sensor element in a centre area, e. g. in the centre of the cover part or lid of the downdraft device or system, may by favourable. In that case, said only one single sensor element may rest on a centre supporting element, e. g. on a diametrical supporting bar, rather than on the collar.

A specific embodiment includes a sensor means, which is electrically connected to a control unit of the downdraft device or system and/or to the control unit of the downdraft cooking hob.

At least one respective evaluation unit may be provided on a printed circuit board comprising said control unit. Alternatively, separate electronic circuits on specific printed circuit boards may be provided, which are only communicating, preferably via an MACS bus or the like, to a user interface and/or a power board circuit and/or a control unit circuit or board.

The sensor means may be of a type of a capacitance pressure or piezoelectric pressure transducer or of any other type, which is known to being used for weight measurement, in particular usable for small appliances, e. g. small domestic appliances.

According to embodiments, the sensor means or module according to anyone of the afore-described essential or specific embodiments is part of or is formed as an add-on module for a household appliance. Said add-on module is adapted to provide for the estimation of the weight of an item placed on a surface of a household appliance, in particular a cookware placed on a top surface of a cooking hob.

The add-on module may comprise a touch sensor or a touch control user interface adapted to receive a user input and/or a wireless communication means configured to be connected with a control unit of the household appliance.

A household appliance according to the invention comprises an at least approximately horizontal panel, in particular a glass panel, which panel is part of or is in functional connection with a scale for weighing an item placed on the panel. The household appliance further comprises or is adapted to be equipped with or coupled with a sensor means or module according to anyone of the above-described essential or specific embodiments. The household appliance may be a cooking hob, in particular an induction cooking hob.

In particular, a control and/or processing unit is connected with the sensor means or module for controlling and/or retrieving data from the sensor means or module and/or for processing a signal or data from the sensor means or module. The control and/or processing unit may comprise or be connected to a database and/or with a look-up table and/or cross-reference list, which may also be a part of the database, for receiving at least approximate weight information correlated to the determined displacement or deflection value.

According to a specific embodiment, the sensor means or module is arranged in a central zone of the panel. In the case of a cooking hob, the sensor means or module is arranged in a central zone of a top plate of a cooking hob and the cooking hob is adapted to determine the weight of cookware by placing it on said central zone or on one of a number of cooking zones, which are arranged on the top plate.

A method for determining the weight of an item on an at least approximately horizontal panel of a household appliance, in particular on a top plate of a cooking hob, is characterized by an acceleration of a panel section or of a panel reference point or reference area, which acceleration is estimated or determined during a displacement or deflection of the panel section or the panel reference point or reference area due to a placing of the item on the panel. The panel reference point or reference area may be locatable or allocatable to a panel surface. In particular, the estimation or determination of the weight is triggered by the placing of the item on the panel or by a user input.

The displacement or deflection or bending of the panel section or the panel reference point or panel reference area is particularly estimated or determined by an integration, preferably by an integration over time, of the acceleration or of the accelerated movement. With said integration the value or intensity of the deflection or bending, particularly after finalization of overshooting and stabilization in the deflected or bent condition, may be exactly calculated. Further, having determined the is value or intensity of deflection or bending, an approximate weight estimation may be performed by means of a database, particularly of a look-up table comprised therein.

The estimated or determined weight information may be displayed on a display means, which may be a user interface of the household appliance or of the sensor means or module. As an alternative, the weight information may be processed during an operating process run in the household appliance, in particular during a cooking process on a cooking hob.

Novel and inventive features of the present invention are set forth in the appended claims.

The present invention will be described in further detail with reference to the drawings, in which FIG. 1 is a schematic top view of an induction cooking hob with four cooking zone, a user interface and an acceleration sensor used for weight determination;

Figure 8A:
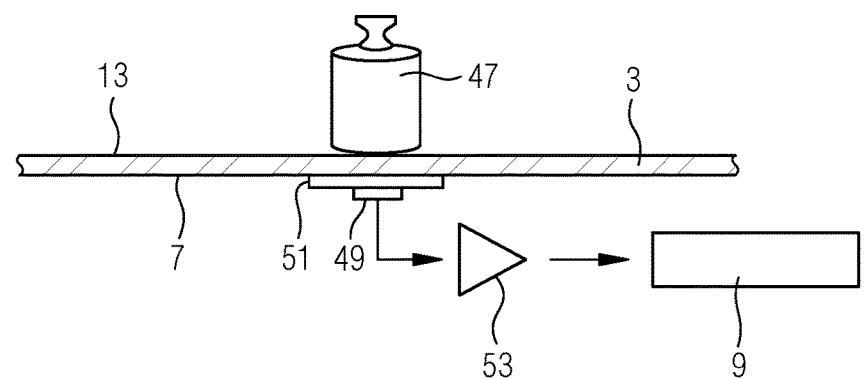
Figure 8B:
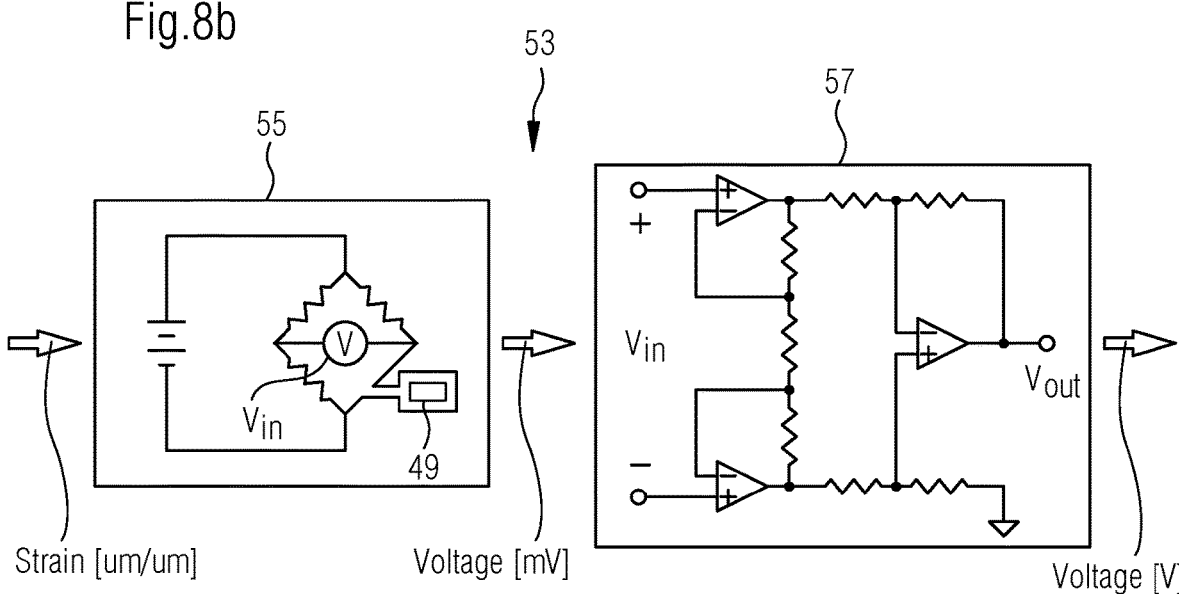
Figure 9:
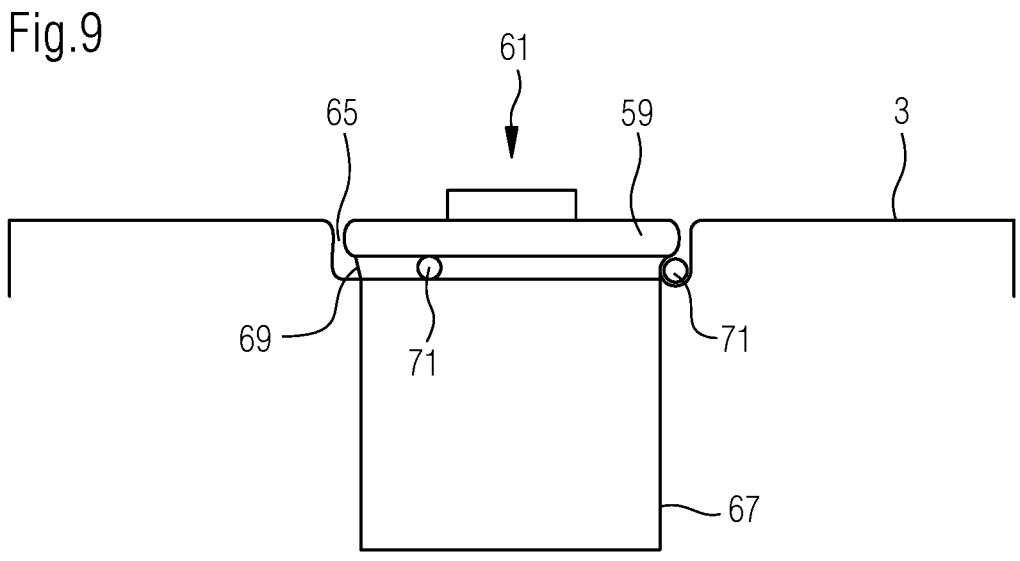
Figure 10:
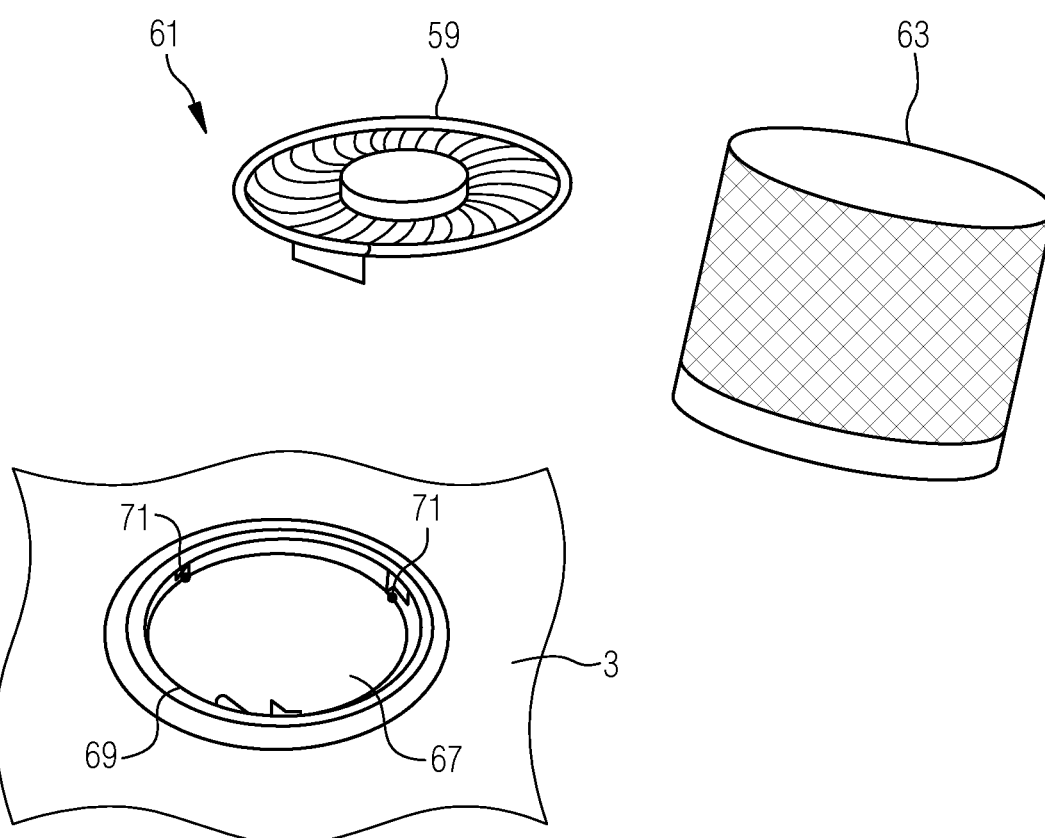

FIG. 8*a* illustrates the top panel of the induction cooking hob under the stress of an sample weight exemplifying determination of pot weight according to a third embodiment;

FIG. 8*b* illustrates the components of the evaluation circuitry for the weight determination according to the third embodiment;

FIG. 9 illustrates schematically a sensor positioning for a fourth embodiment for pot weight determination; and FIG. 10 illustrates the disassembled arrangement of the device of FIG. 9.

Figure 1:
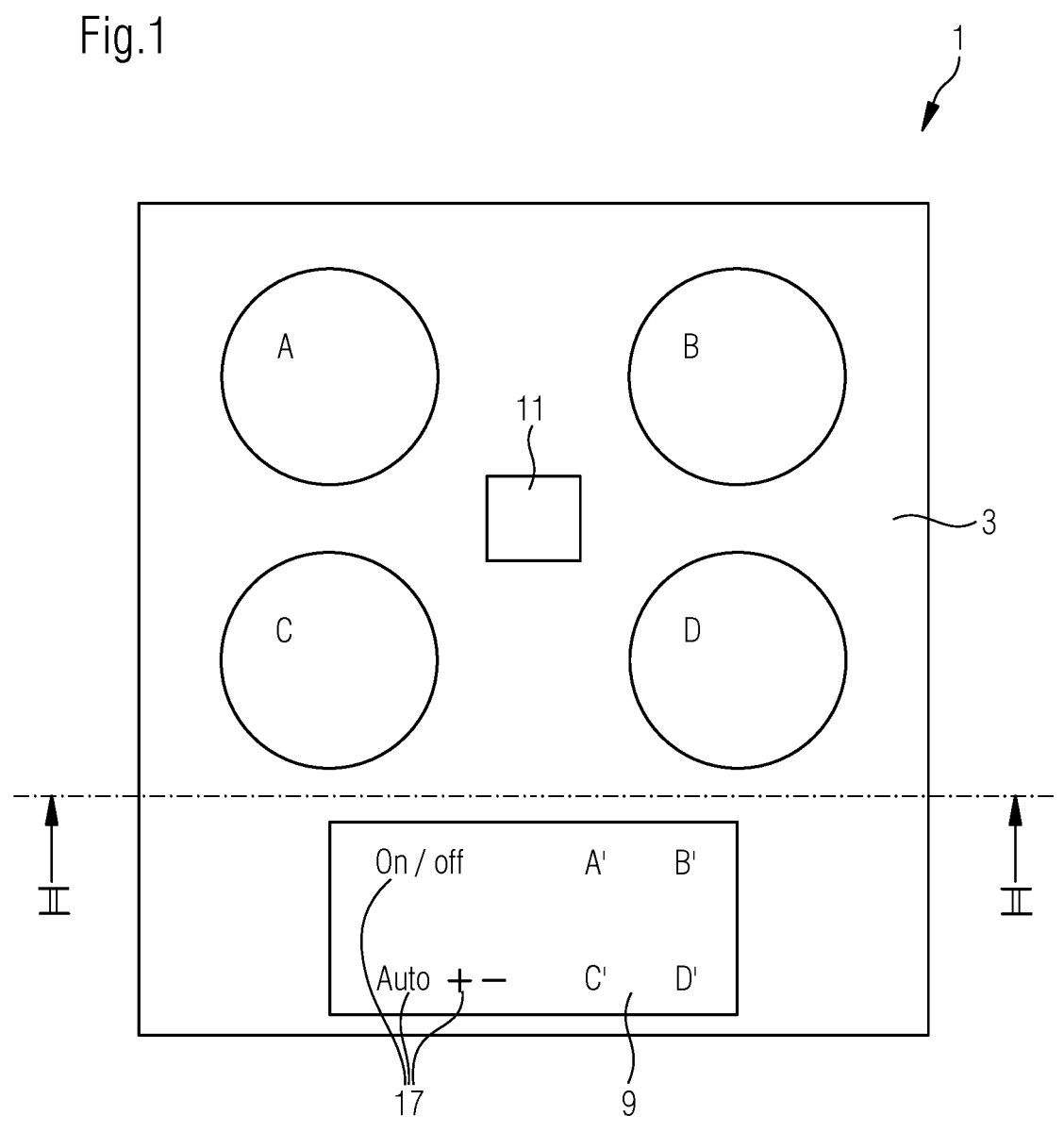
Figure 2:
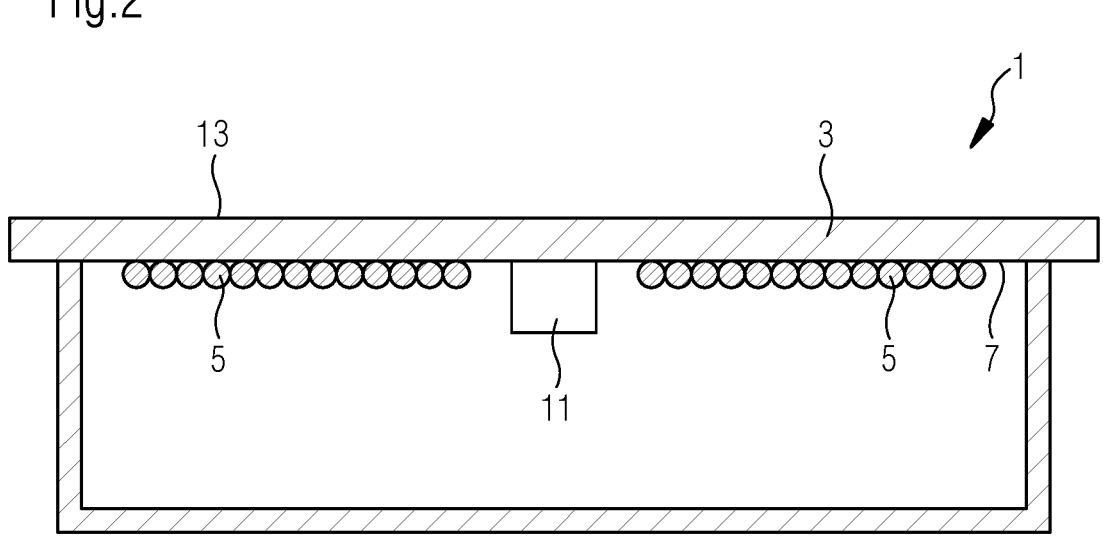
FIG. 2 is a schematic cross-sectional view of the induction cooking hob of FIG. 1 along the line II-II.

With FIGS. 1 and 2, both in a top view and in a cross-sectional view along the line II-II indicated in FIG. 1, an induction cooking hob 1 is schematically illustrated, indicating by circles four cooking zones A, B, C, D rectangularly arranged on a glass ceramic top panel 3. Each cooking zone A, B, C, D is heated by induction coils 5 arranged close to a bottom surface 7 of the top panel 3. The induction cooking hob 1 is further equipped with a user interface 9 positioned at the front edge of the induction cooking hob 1. The induction cooking hob 1 further comprises an accelerometer 11, i. e. an acceleration sensor. Said accelerometer 11 is configured to determine and/or measure an acceleration, which may be a vibration or just an accelerated downwards movement, of the centre of the top panel 3 in vertical direction during or due to the impact of a manual or mechanical action onto the top side 13 of the top panel 3 or of a placement of a load like a cooking pot 15 filled with food.

The user interface 9 comprises a touch sensitive display adapted to receive user inputs for the operation of the cooking zones A, B, C, D and to display information, for example status information of the cooking zones A, B, C, D. The user can operate the cooking zones A, B, C, D through touch switches A', B', C', D', each one thereof assigned to one of the cooking zones A, B, C, D. Further touch switches 17 for other hob functions are covered as well.

Figure 3:
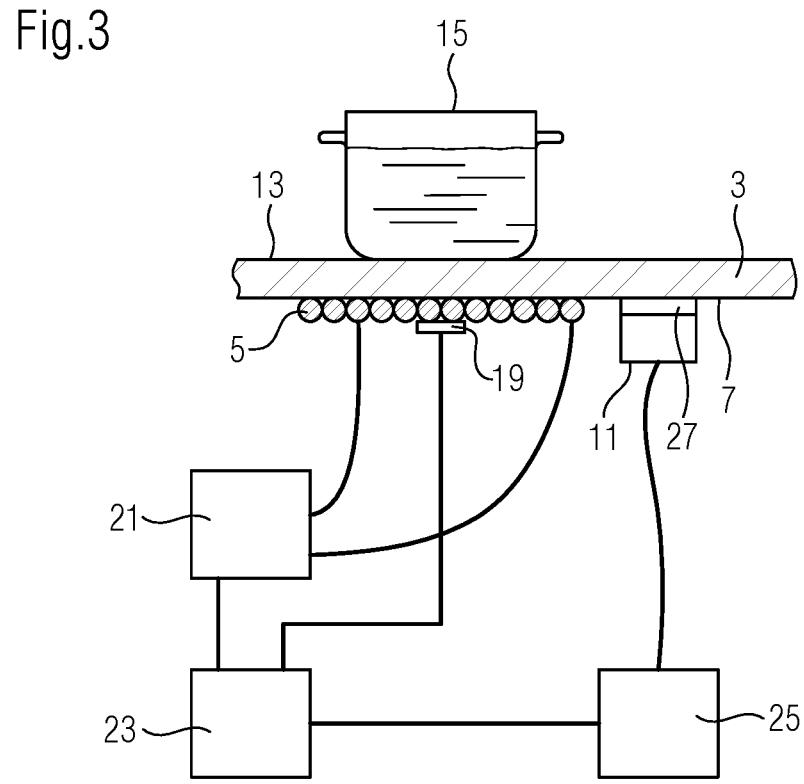
FIG. 3 is a schematic detail view of detail III indicated in FIG. 2, with additional components and wiring.

FIG. 3 illustrates a detail view of one of the cooking zones A, B, C, D together with a schematic presentation of the wiring required for its operation. This illustration can also be seen as a basic configuration generally for an induction cooking hob 1 using the example of only one cooking zone A, B, C, D. FIG. 3 shows the section with the one cooking zone A, B, C, D, with the top panel 3 supporting a cooking pot 15 above the cooking zone A, B, C, D. The cooking zone A, B, C, D is exposed to electromagnetic waves emanated from the induction coil 5 located underneath the cooking zone A, B, C, D, the waves inducing eddy currents in the bottom of the cooking pot 15 with the effect of heating up said pot bottom. Located in the area of the cooking zone A, B, C, D is a thermal sensor 19, such as a thermostat, providing information about a temperature in this area. Further, an induction generator 21 for magnetic waves is shown, which is connected to a controller 23, which controls the signals and the energy of the signals generated by the generator 21. A user interface controller 25 is also shown, which is connected to the controller 23 and to the accelerometer 11, which is a micro-electromechanical system (MEMS) in the present example. As illustrated, the micro-electromechanical system 11 is attached to the induction cooking hob 1 indirectly via a dielectric shield 27, which may be made of a mica mineral substance being a hard substance, which does not substantially dampen vibrations and which protects the micro-electromechanical system 11 from electromagnetic waves emanated from the induction coil 5 or an electric field that builds up or is present during operation or at the induction cooking hob 1. At the same time, mica also provides good thermal isolation against heat transmitted from e. g. a hot cooking pot 15 through the glass ceramic top panel 3.

Figure 4:
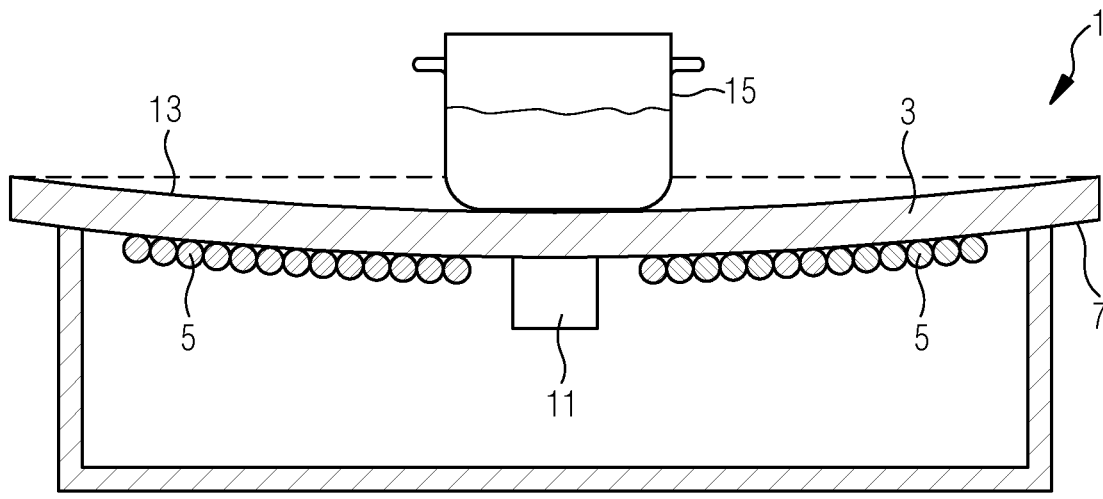
FIG. 4 is the schematic cross-sectional view according to FIG. 1, but with a cooking pot placed on a centre zone of a top panel of the induction cooking hob for determination of pot weight.

The above-described setup is used for the determination of the weight of the cooking pot 15 and specifically the weight of its content, particularly for weighing out newly added ingredients. As illustrated with FIG. 4, the placing of the cooking pot 15 causes the top panel 3 of the induction cooking hob 1 to bend or deflect downwardly due to the weight of the cooking pot 15 (excessively shown for reasons of clarity). The magnitude of the bending or deflection is dependent on the weight value, so that the actual weight can be determined by measuring the said bending or deflection magnitude, which is a replicable process. Said bending or deflection measurement is performed by an integration over time of the acceleration or the accelerated movement of the reference area in the centre zone of the top panel 3 by means of the accelerometer 11, or the MEMS, respectively, which centre zone is also the position of fixation of the accelerometer 11 and is signalized on the top surface 13 of the top panel 3 as being the defined weighing area of the induction cooking hob 1.

Figure 5:
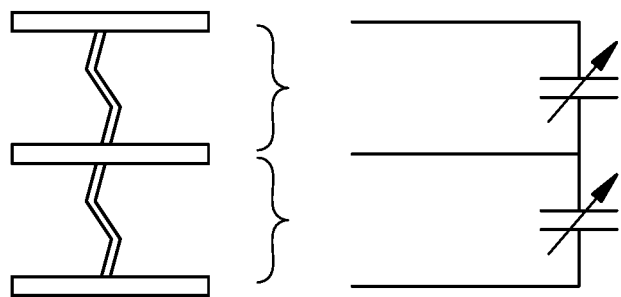
FIG. 5 illustrates a schematic structure of an acceleration sensor applied within the induction cooking hob according to FIG. 1.

FIG. 5 illustrates schematically the structure of the MEMS acceleration sensor 11, which is of the type of a gravity sensor. Basically, the MEMS structure provides three piled plates 29a, 29b, 29c connected with each other by means of spiral springs 31. The upper and the lower plates 29c, 29a are fixed and the intermediate plate 29b is movable, but its movability is limited by the spiral springs 31. Such setup provides a series connection of two capacitors 33 with variable capacities because of a variable distance of the two plates 29a-29b, 29b-29c of a capacitor 33 following the movement of the intermediate plate 29b. In the situation of no movement or a constant movement, the plates 29a, 29b, 29c are in an equidistant arrangement, but in the case of an accelerated movement of the acceleration sensor 11 the intermediate plate 29b is moved due to its moment of inertia. The occurring capacity changes are proportional to the acceleration and an integration of actual capacities allows the deduction of the covered deflection.

Figure 6:
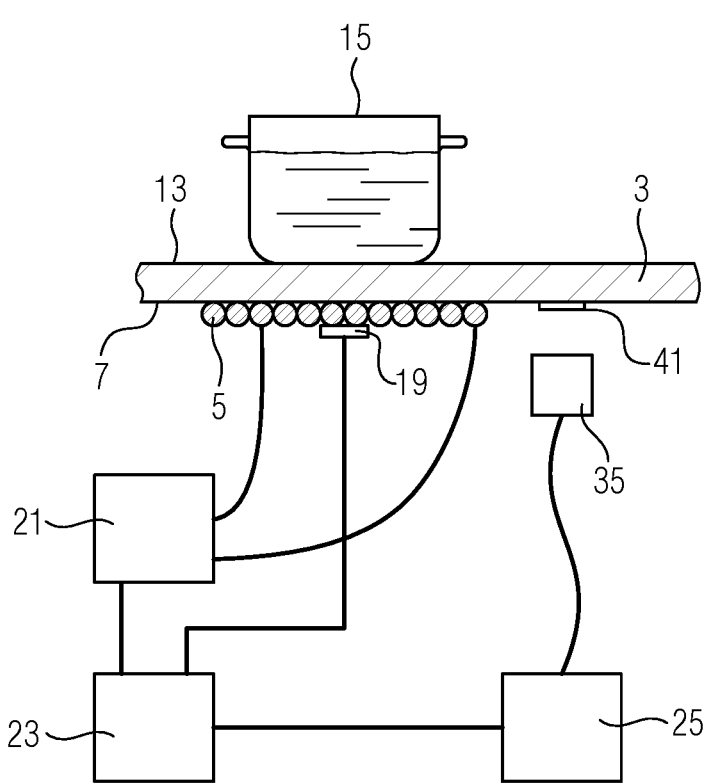
FIG. 6 is the detail view of FIG. 3, however with the acceleration sensor being replaced by a reflective photointerrupter for determination of pot weight according to a second embodiment.

A second embodiment for the determination of the weight of a cooking pot 15 is shown in FIG. 6. The structure of this embodiment is similar to the first one, which is readily understood when comparing it with FIG. 3. Similar to the practice of the first one, also the weight determination according to the second embodiment relies on the measurement of the magnitude of the displacement or deflection of the top panel 3 of the induction cooking hob 1 under the load of a cooking pot weight. However, said displacement or deflection is determined by means of an optical device comprising a photo sensor or photointerrupter 35. There are several types of such optical sensors known, usually operating with light emitting 37 and receiving 39 elements. The two basic types of photointerrupters 35 are the transmissive type (gap type) and the reflective type. The transmissive type is easier to operate because all optical elements 37, 39 are already adjusted. A signal is generated by interrupting light emitted from the light emitting element 37 on its way to the light receiving element 39 by an obstacle. The reflective type photointerrupter 35 needs a reflecting surface 41 for reflecting light emitted from the light emitting element 37. Since the light emitting and receiving elements 37, 39 facing the same direction, the distance of the reflecting surface 41 to the reflective type photointerrupter 35 is determined by the duration or transit time of emission and receipt of a light signal.

Figure 7:
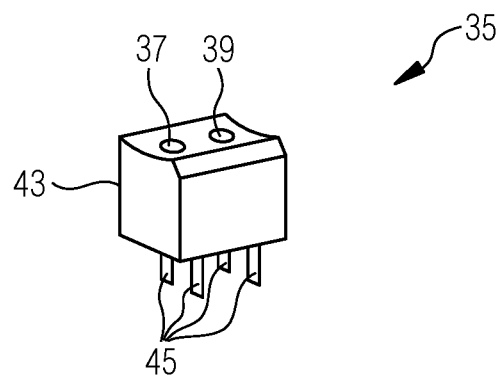
FIG. 7 is a detail illustration of the photointerrupter of FIG. 6.

In the present example a reflective type photointerrupter 35 is used. An example of this sensor type, which is shown in FIG. 7, is adapted to be mounted on a printed circuit board which may be fixed on an internal housing or compartment structure inside of the induction cooking hob 1, particularly on or at a carrier part for at least one induction coil 5 or on a protection box for the electronic components and circuit boards of the induction cooking hob 1. Generally, said fixation can be arbitrarily chosen, it just has to be ensured to choose a stationary position, uncoupled from the top panel 3. The photointerrupter 35 comprises a housing 43, said light emitting element 37, said light receiving element 39 and two ports 45 for each of said elements. Via these ports 45, an electronic unit on the printed circuit board and associated software the above-mentioned duration or transit time between emission and receipt of a light signal can be identified, which light signal is reflected from a reflecting surface 41 on the bottom surface 7 of the top panel 3, see FIG. 6. The primary output of the photointerrupter 35 is an analogue signal, which is interpreted by said software. For a trouble-free measurement of said duration or transit time, an adequate distance between photointerrupter 35 and top panel 3 has to be chosen. Said reflecting surface 41 on the bottom surface 7 of the top panel 3 may be applied by conventional printing on glass ceramic surface or by a drop of colour, particularly white colour. An application of a stencil on the glass surface is proposed for having a distance for thermal reasons.

FIG. 8a illustrates a third embodiment for weight determination of a cooking pot 15 by way of top panel displacement or deflection by showing an experimental arrangement. In this figure, the weight load provided by a cooking pot 15 is simulated by a sample weight 47 placed on a glass ceramic top panel 3 as used in an induction cooking hob 1. The scale integrated in the induction cooking hob 1 comprises a strain gauge 49 attached to the bottom surface 7 of the top panel 3 by means of a glue 51. Due to this fixed attachment, the strain gauge 49 is following the bottom surface 7 in its extension, or elongation, respectively, which occurs when the top plate 3 is bent or deflected downwards. Said elongation exerted on the strain gauge 49 causes a N resistance change which can be measured with applying a voltage thereon or, as a more reliable method, using an evaluation circuit 53 (see FIG. 8b) comprising a Wheatstone bridge 55 and an instrumentation amplifier 57. Said evaluation circuit 53 works as follows: when the strain gauge 49 is put under stress (i.e. deflection causing an elongation), there is a resistance change in the strain gauge 49, which changes the voltage measurable at the Wheatstone resistance bridge 55. Said voltage is transferred to the instrumentation amplifier 57 as a voltage input $V_{in}$, which voltage $V_{in}$ is amplified by the amplifier 57, in this respect improving readability and the accuracy of the measurement. Insofar, intensity of resistance change in the strain gauge 49 and voltage output $V_{out}$ of the instrumentation amplifier 57 is proportional to the magnitude of strain gauge elongation and, hence, the top panel deflection. That way, weight of the cooking pot 15 can be determined with high accuracy.

More generally, the Wheatstone bridge 55 is used for converting the strain resistance variation into voltage variation. But is since the voltage output of the Wheatstone bridge 55 is typically too small for analysing said variation, an amplifier 57 for amplifying said voltage output may be necessary. The evaluation process for the selection of a suitable amplifier is dependent on a number of different parameters. In many situations the selection of an instrumentation amplifier 57 is convenient.

According to FIG. 8*a*, the voltage output is transmitted to an evaluation circuit 53, particularly an electronic assembly within the user interface 9, which displays the weight of the cooking pot 15, for example on the user interface display, after conversion by means of a concordance list in a database of the induction cooking hob 1.

Finally, a fourth embodiment for weight determination of a cooking pot 15 using an integrated scale in the induction cooking hob 1 is illustrated with FIGS. 9 and 10. In this example, there is no displacement or deflection of the entire top panel 3, rather, an insert arranged or arrangeable in a cutout area of the top panel 3 is displaced or moved in relation to the top panel 3 under the weight of an item to be weighed. The present example shown in FIGS. 9 and 10, discloses a cover part 59 of a downdraft device or system, which is particularly a lid 59 of a downdraft exhaust system 61 implemented in a centre area of the cooking hob 1. The lid 59 is removable for a disassembly of a filter unit 63, as illustrated with FIG. 10 showing the disassembled lid 59 and the cylindrical filter cartridge 63.

As shown in FIG. 9, the downdraft exhaust system 61 is arranged in a cutout 65 in the centre area of the cooking hob 1. Said downdraft exhaust system 61 comprises a cylindrical exhaust compartment 67 including said cylindrical filter cartridge 63. The upper frame 69, which is arranged close to the circular cutout 65 in the top panel centre, of the cylindrical exhaust compartment 67 also forms a collar for supporting the lid 59 and provides a support for three weight sensors 71, which are arranged on the corners of an equilateral triangle. That way, the weight sensors 71 are squeezed between the lid 59 and the upper frame 69 of the exhaust compartment 67.

The weight sensors 71 are preferably fixed to the upper frame 69 of the exhaust compartment 67, which allows them to be connected to the controller 23 or to the user interface 9 of the cooking hob 1 by wired connection. However, also coupling them to the lid 59 is possible, particularly when they are equipped with wireless communication means for a communication with the controller 23 or user interface 9.

Although an illustrative embodiment of the present invention has been described herein with reference to the accompanying drawing, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims. In particular, the above examples are all described with reference to induction cooking hobs 1, but the invention is not limited to this type. Rather, all other types of cooking hobs shall be covered as well, for example radiant hobs or gas hobs.

LIST OF REFERENCE NUMERALS

1 induction cooking hob
3 top panel
5 induction coil
7 bottom surface
9 user interface
11 accelerometer
13 top side/top surface
15 cooking pot
17 touch switches
19 thermal sensor
21 induction generator
23 controller

25 user interface controller
27 dielectric shield
29*a*, 29*b*, 29*c* plates
31 spiral spring
33 capacitor
35 photointerrupter
37 light emitting element
39 light receiving element
41 reflecting surface
43 housing
45 port
47 sample weight
49 strain gauge
51 glue
53 evaluation circuit
55 Wheatstone bridge
57 instrumentation amplifier
59 cover part/lid
61 downdraft exhaust system
63 filter cartridge
65 cutout
67 exhaust compartment
69 upper frame
71 weight sensors
A, B, C, D cooking zones
A', B', C', D' touch switches
$V_{in}$, $V_{out}$ input voltage, output voltage

The invention claimed is:

1. A sensor means or module for estimating or determining a weight of an item on a panel or an insert in relation to the panel, the sensor means or module and the panel forming a scale, the sensor means or module being adapted to be integrated in or allocated to a household appliance comprising a cooking hob,
   wherein the sensor means or module comprises or is connected to at least one processing and/or interpretation and/or compilation means, and
   wherein the sensor means or module comprises:
      a photosensor configured to measure a distance to a reference point or a reference area of the panel, wherein the photosensor is a reflective type photosensor and the reference point or reference area comprises a reflecting surface being a shiny surface of the panel, a surface of a metal evaporation glass, or a surface of a drop of a color or print applied on the panel, wherein the photosensor is positioned underneath the panel and/or is a photointerrupter, and
      an acceleration sensor configured to detect an acceleration of a panel section, the reference point, or the reference area of the panel, the acceleration sensor being configured to detect the acceleration during an elastic displacement, deflection, or bending of the panel or the panel section due to placing the item to be weighed on the panel.

2. The sensor means or module according to claim 1, wherein the photosensor is arranged or arrangeable distant from the panel at a housing or a frame part of the household appliance or of a component or module arranged inside of the household appliance.

3. The sensor means or module according to claim 1, wherein the photosensor is applied on a printed circuit board, which is connected to or fixed to a housing or to a frame part of the household appliance.

4. The sensor means or module according to claim 1, further comprising calculation means configured to estimate the displacement or deflection or bending of the panel or panel section at the reference point or reference area by integration of the acceleration or of accelerated movement.

5. The sensor means or module according to claim 1, wherein the sensor means or module comprises:

the at least one strain gauge and/or extensometer, and a Wheatstone bridge circuit for estimation of a strain resistance corresponding to a strain level or the value of the length extension.

6. The sensor means or module according to claim 5, wherein an amplifier is allocated to or connected to the strain gauge and/or to the extensometer and/or to the Wheatstone bridge circuit.

7. The sensor means or module according to claim 5, further comprising at least one of:

a specifically increased bridge voltage of the Wheatstone bridge circuit in a range of about 5 V to about 12 V;

a specifically increased gauge factor of the strain gauge, the gauge factor being within a range of about 5 to about 16;

a low noise amplifier and/or a rail to rail amplifier and/or a high gain instrumentation amplifier.

8. The sensor means or module according to claim 1, wherein the insert, which is displaced or moved in relation to the panel under the weight of the item to be weighed, is a removable cover part of a downdraft device of said cooking hob.

9. The sensor means or module according to claim 8, wherein the sensor means or module is arranged between the cover part and a collar for supporting the cover part, which collar is arranged at the panel and forms an upper frame of a filter element or a filter inlet or filter chamber, the sensor means being coupled with the cover part or with the collar.

10. The sensor means or module according to claim 8, wherein the sensor means or module is arranged between the cover part and a supporting element providing support for the sensor means or module in a central area of the downdraft device.

11. The sensor means or module according to claim 8, wherein magnetic and/or adhesive elements or other fixing elements or means are comprised for adherence of the cover part at the collar, and/or of the sensor means or module at the cover part or at the collar or a supporting element that provides support for the sensor means or module.

12. The sensor means or module according to claim 1, being part of or being formed as an add-on module for the household appliance.

13. The sensor means or module according to claim 12, wherein the add-on module comprises:

a touch sensor or a touch control user interface adapted to receive a user input, and/or a wireless communication means configured to be connected with a control unit of the household appliance.

14. A cooking hob comprising or being adapted to be equipped with or coupled with the sensor means or module according to claim 1.

15. The cooking hob according to claim 14, wherein a control and/or processing unit is connected with the sensor means or module for controlling and/or retrieving data from the sensor means or module and/or for processing a signal or data from the sensor means or module, the control and/or processing unit comprising or being connected with a look-up table and/or cross-reference list for receiving at least approximate weight information correlated to a determined displacement or deflection value.

16. The cooking hob according to claim 14, wherein the sensor means or module is arranged in a central zone of a top plate of the cooking hob, said sensor means or module being adapted to determine a weight of cookware by placing the cookware on said central zone or on one of a number of cooking zones thereof.

17. A method for estimating or determining a weight of an item on a panel of a cooking hob, wherein the method includes:

using a photosensor to measure a distance to a reference point or a reference area of the panel, wherein the photosensor is a reflective type photosensor and the reference point or reference area comprises a reflecting surface being a shiny surface of the panel, a surface of a metal evaporation glass, or a surface of a drop of a color or print applied on the panel, wherein the photosensor is positioned underneath the panel and/or is a photointerrupter; and using an acceleration sensor to detect an acceleration of a panel section, the reference point, or a reference area of said panel, wherein the acceleration sensor detects the acceleration during an elastic displacement, deflection, or bending of the panel section, due to placing the item to be weighed on the panel, the estimation or determination of the weight being triggered by the placing of the item on the panel or by a user input.

18. The method according to claim 17, wherein:

the estimation or determination of the weight is triggered by the placing of the item on the panel or by a user input, and the elastic displacement, deflection, or bending is estimated or determined by an integration over time of the acceleration.

19. The method according to claim 17, wherein the estimated or determined weight is displayed on a display means, or is processed during a cooking process on the cooking hob.

20. A household appliance comprising a cooking hob having glass or ceramic top panel defining at least one cooking zone, at least one sensor positioned underneath said top panel for estimating or determining a weight of an item on the top panel, and a controller operatively coupled to the at least one sensor; said at least one sensor comprising:

a photosensor connected or fixed to a housing or frame part of the household appliance, said photosensor being a reflective type photosensor configured to measure a distance to a reference point or reference area and thereby to detect deflection of said top panel in a range of 0.01 to 0.3 mm as a result of the item being placed on an upper surface of said top panel; said reference point or reference area comprising a reflecting surface being a shiny surface of the panel, a surface of a metal evaporation glass, or a surface of a drop of a color or print applied on the panel; said photosensor being further configured to transmit to said controller a photosensor signal corresponding to said deflection of the top panel; said controller being configured to determine the weight of said item through reference to a lookup table based on said photosensor signal, wherein the photosensor is positioned underneath the panel and/or is a photointerrupter; and an acceleration sensor configured to detect an acceleration of a panel section, the reference point, or the reference area of said top panel due to deflection thereof as a result of the item being placed on the upper surface of said top panel; the acceleration sensor being further configured to transmit to said controller an acceleration signal corresponding to the detected acceleration; said controller being configured to calculate or estimate the weight of said item by integrating the detected acceleration, or by integrating a movement of the top panel during said detected acceleration, over time, wherein the acceleration sensor is configured to detect the acceleration during an elastic displacement, deflection, or bending of the panel or the panel section due to placing the item to be weighed on the panel.

* * * * *